Figure 1:
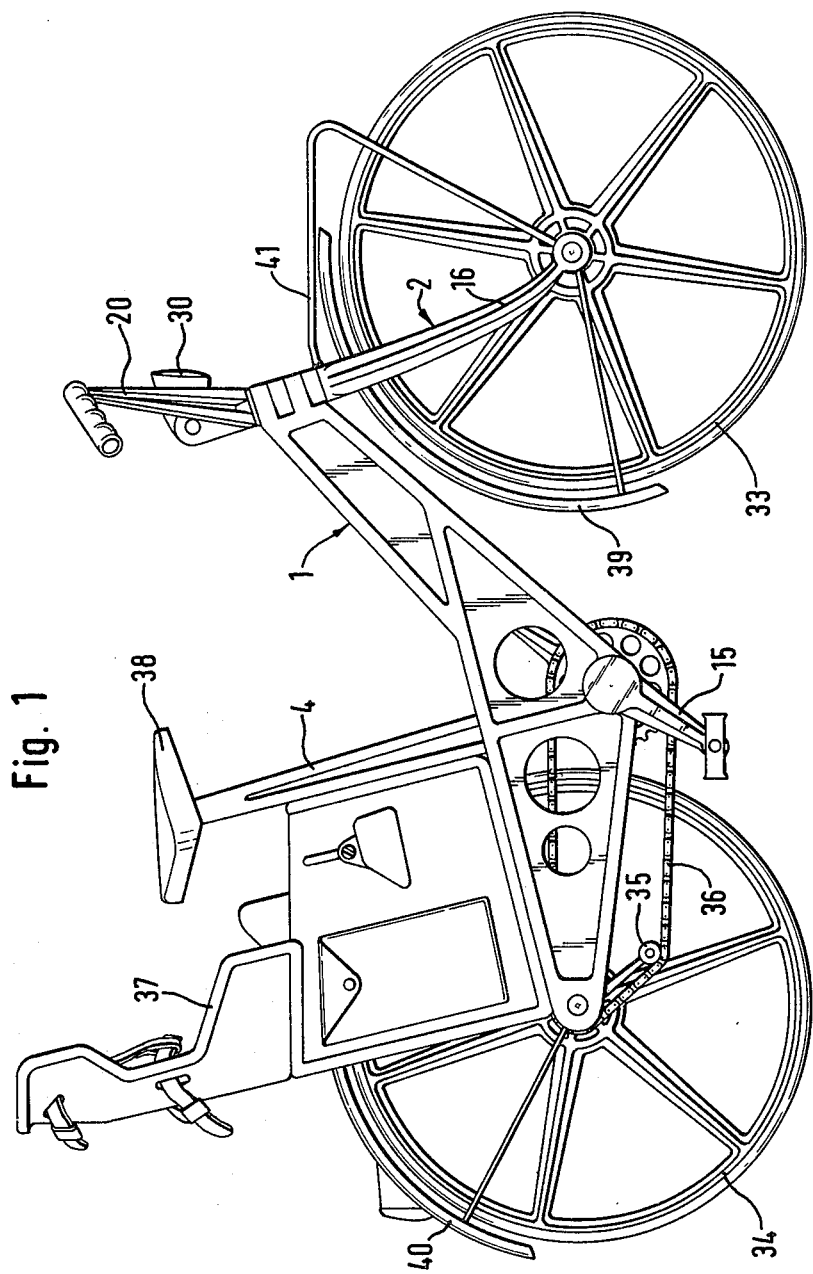

United States Patent [19]

Olsson et al.

[11] 4,350,360
[45] Sep. 21, 1982

[54] ASSEMBLY OF PREFABRICATED BICYCLE COMPONENTS

[76] Inventors: Jan G. Olsson, Sjögangen 6, 421 71 Via Frölunda; Lars E. Samuelsson, Hedängen 5, 43370 Partille, both of Sweden

[21] Appl. No.: 129,263

[22] Filed: Mar. 11, 1980

[30] Foreign Application Priority Data

Mar. 12, 1979 [SE] Sweden .................. 7902201

[51] Int. Cl.³ .................................... B62K 21/06
[52] U.S. Cl. .............................. 280/279; 280/278; 403/289
[58] Field of Search ............. 280/274, 278, 279, 280, 280/287; 403/109, 289; 24/260, 81 AC, 88

[56] References Cited

U.S. PATENT DOCUMENTS

| | | | |
|---|---|---|---|
| 2,358,035 | 9/1944 | Schwinn | 280/279 |
| 2,656,202 | 10/1953 | Mueller | 403/289 |
| 3,099,895 | 8/1963 | Beebe | 403/289 |
| 3,865,437 | 2/1975 | Crosby | 403/289 |
| 4,079,957 | 3/1978 | Blease | 280/278 |

Primary Examiner—Joseph F. Peters, Jr.
Assistant Examiner—Randall A. Schrecengost

[57] ABSTRACT

It is an object of the invention to provide a bicycle, which starting from a kit of components is very simple to mount, and which in mounted condition in spite of a low price produces a stable bicycle, which is resistant to rough handling and negligence, and which has the requirements for good functioning also after a long time of use.

The assembly of bicycle components according to the invention comprises a frame member (1). Furthermore, the assembly comprises a front fork component (2), which is provided with a shank portion (18), which forms axially acting thrust stops (17, 19a) engaging the upper and lower ends respectively of the steering hub, one of the thrust stops being formed by outwards pointing spring pawls (19) adapted to directly or indirectly cam into the corresponding end portion of the steering hub by snap action when the shank portion is being inserted into the steering hub.

3 Claims, 11 Drawing Figures

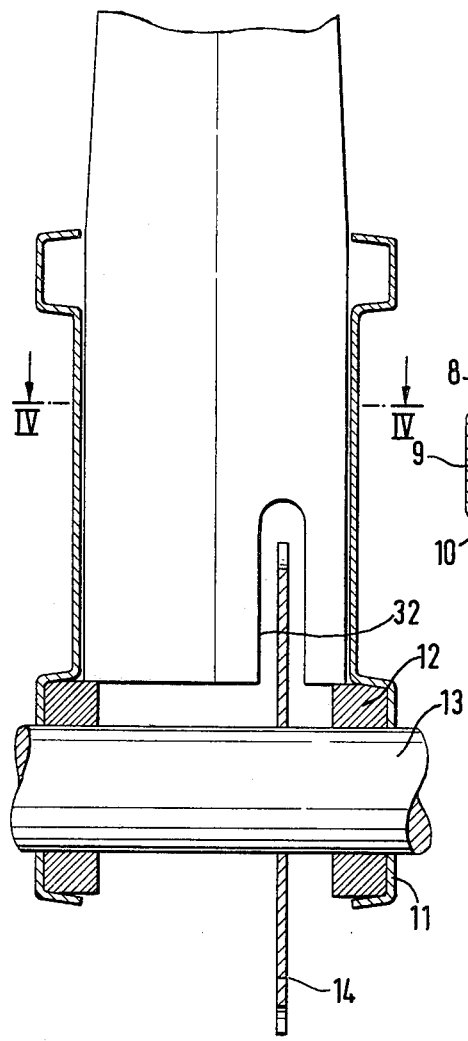
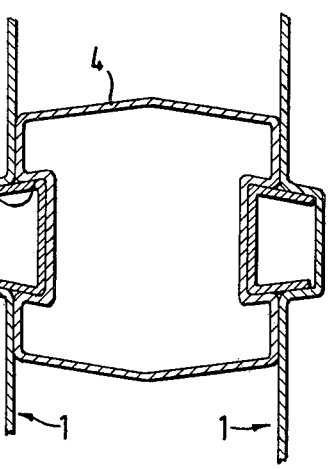
Fig. 3
Fig. 4

ASSEMBLY OF PREFABRICATED BICYCLE COMPONENTS

The present invention relates to an assembly of prefabricated bicycle components comprising a frame member having a sleeve-shaped steering hub.

Since the bicycle nowadays has turned out to be a transportation means of more and more increasing importance for recreational as well as for utilitarian purpose, i.e. in connection with frequent short trips, where the car previously was used, a large demand has arisen, and it should be possible that as great a number of persons as possible should have an opportunity to use a bicycle. To this end it is a prerequisite that the bicycle shall be available at such a low market price that nobody because of financial reasons shall have to refrain from the acquisition of a bicycle. It is another prerequisite that the bicycle shall stand rough handling and be comparatively resistant to rain and other weather conditions. In order to make it possible to maintain the price at as low a level as possible, it is desirable that the bicycle be manufactured of a cheap material, such as for example plastics, comprise a comparatively small number of easily diecast parts and be so simple to assemble that the mounting can be made by the buyer himself for which operation only a minimum of tools should be required.

The above mentioned objects are fulfilled by an assembly of prefabricated bicycle components according to the invention, which essentially is characterized by comprising a front fork component, which is provided with a shank portion, which forms thrust stops engaging the upper and lower ends respectively of the steering hub, one of the thrust stops being formed by outwards pointing spring pawls adapted to directly or indirectly cam into the corresponding end portion of the steering hub by snap action when the shank portion is being inserted into the steering hub.

Figure 2:
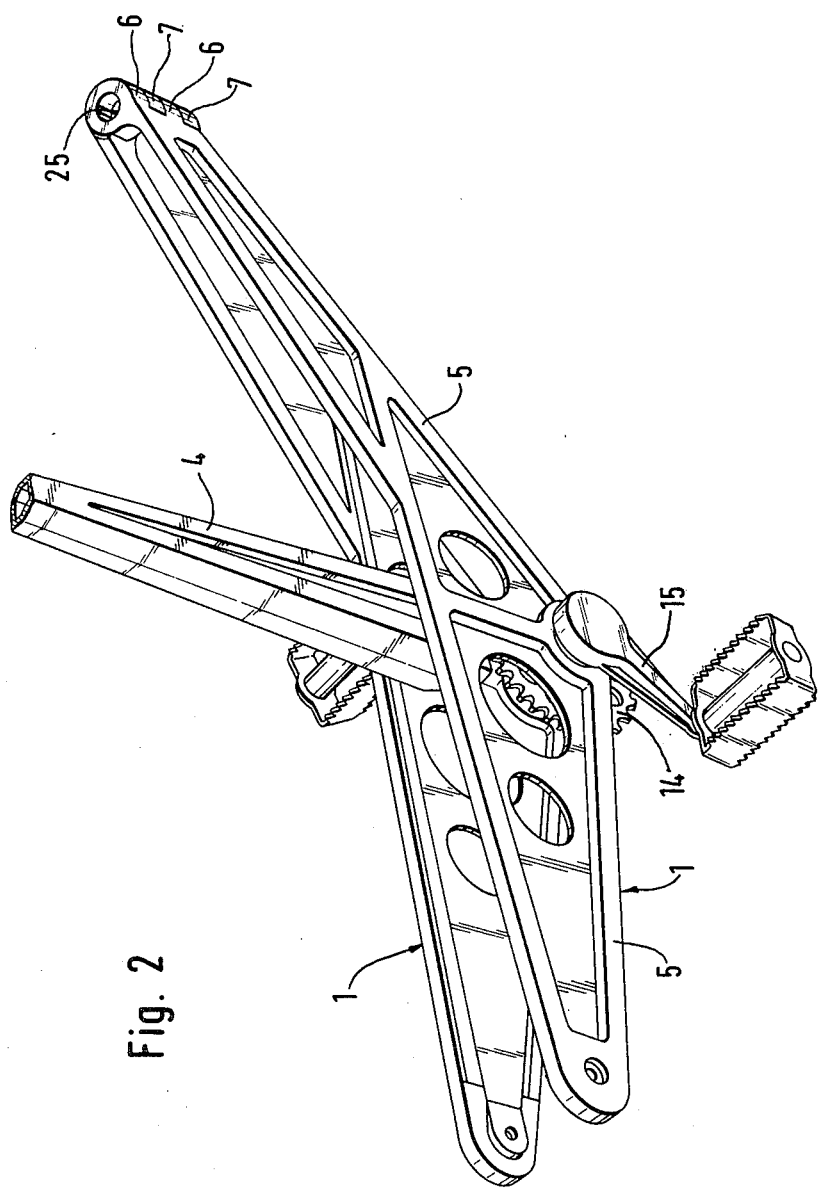
Figure 5:
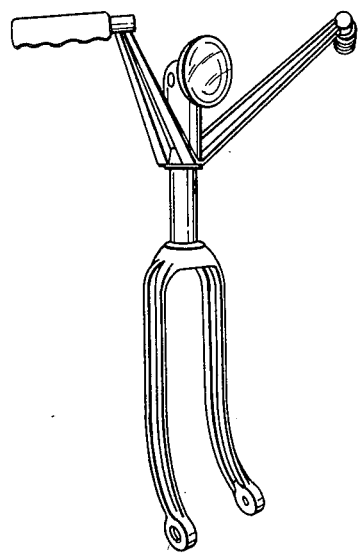
Figure 6:
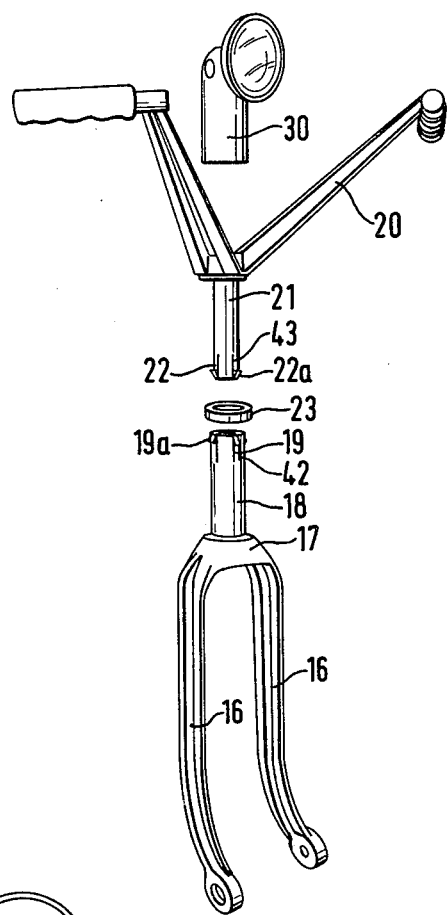
Figure 7:
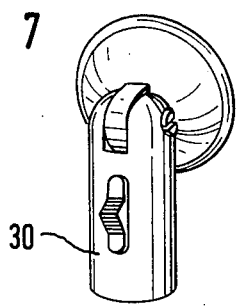
Figure 8:
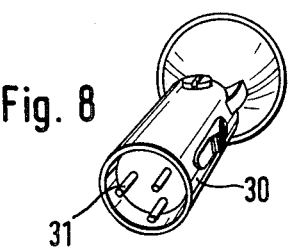
Figure 9:
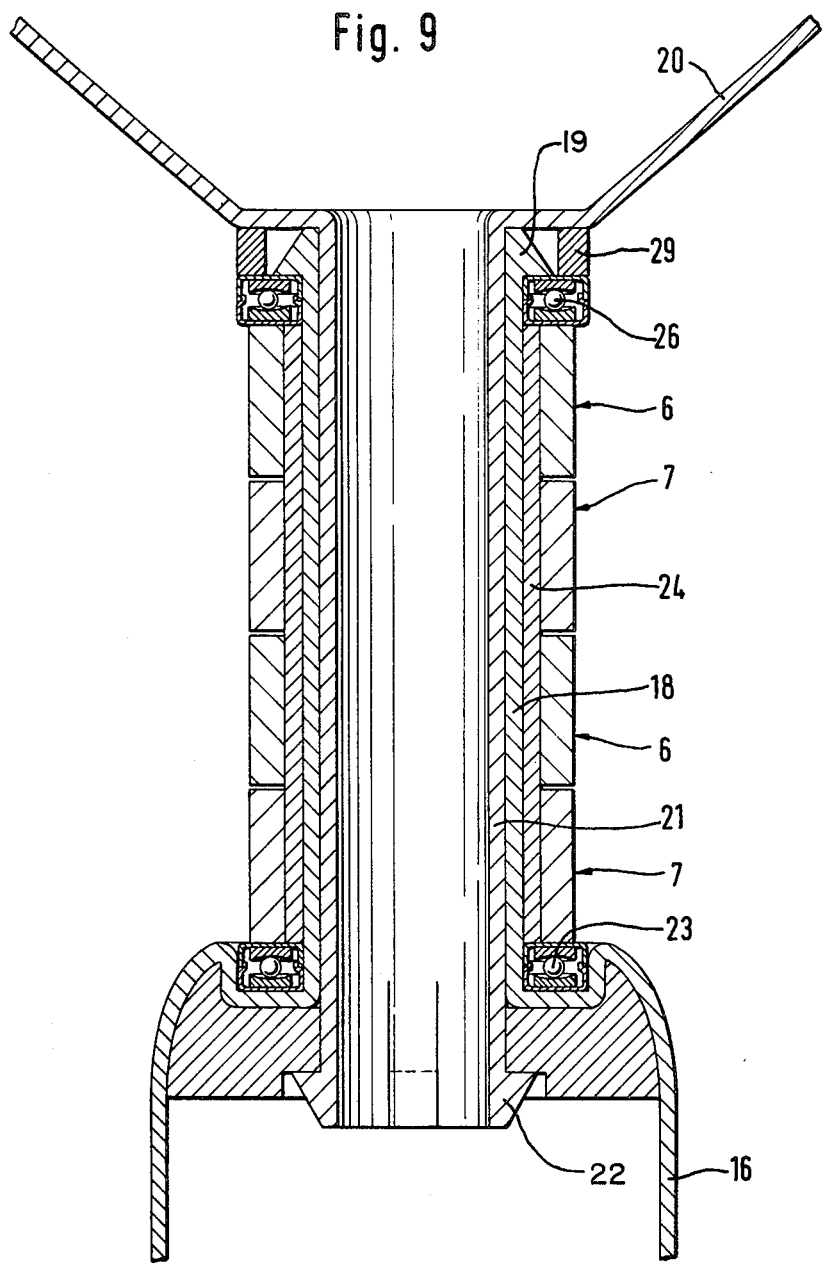
Figure 10:
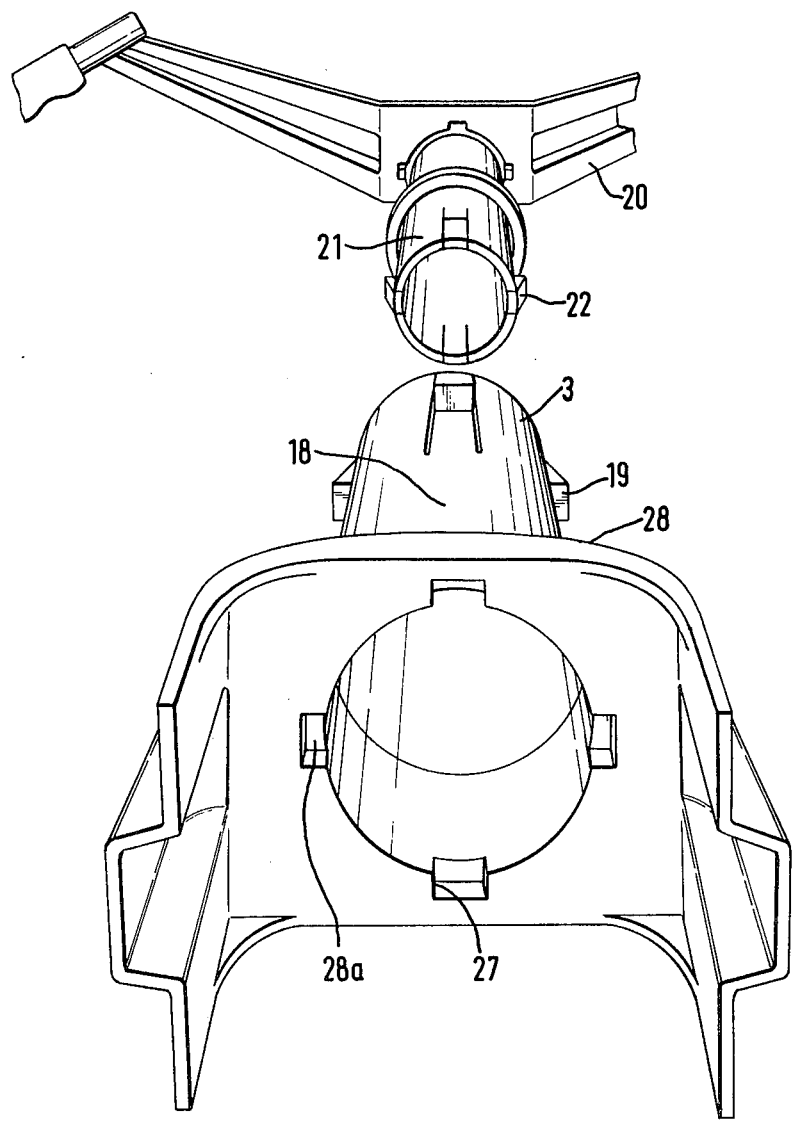
Figure 11:
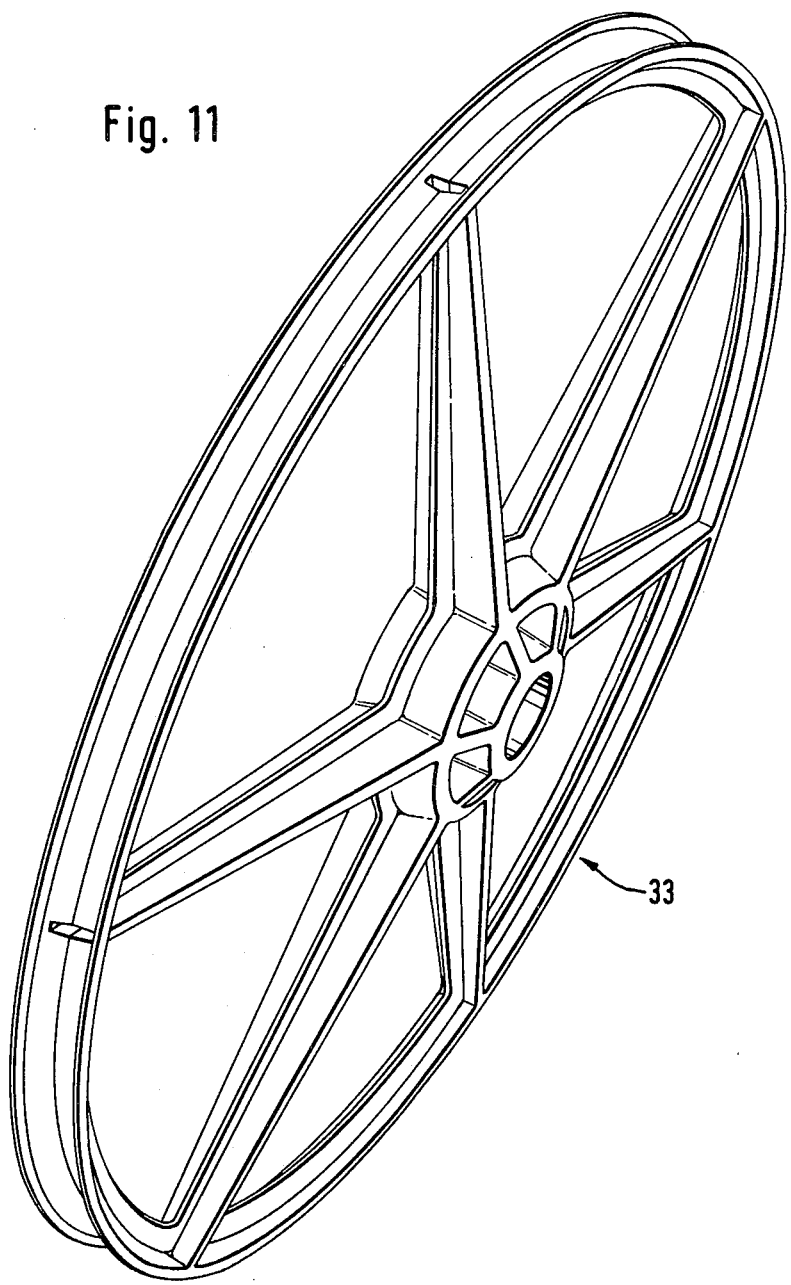

An example of an embodiment of the object of the invention is described in the following, reference being made to the accompanying drawings, in which FIG. 1 is a side elevational view of a bicycle mounted together with the assembly of parts according to the invention, FIG. 2 is a perspective view of the frame portion of the bicycle in mounted together condition, FIG. 3 is a view of a cross-section through the frame portion of the bicycle in the longitudinal direction of the saddle pillar, FIG. 4 is a cross-sectional view substantially along the line IV—IV in FIG. 3, FIG. 5 is a perspective view of the portion comprising the front fork and steering unit in mounted together condition, but for clarity's sake disassembled from the frame, FIG. 6 is an exploded view of the same portion comprising the steering and front fork unit, FIGS. 7 and 8 show a headlight belonging to the equipment, FIG. 9 is a view of a longitudinal cross-section through the steering hub unit of the bicycle and juxtapositioned parts of the bicycle handle bar and the front fork, FIG. 10 is a perspective view of the components illustrated in FIG. 6 as seen from the underside, and FIG. 11 shows a wheel rim forming part of the assembly of bicycle components.

The frame of the bicycle illustrated in the drawings comprises two lateral frame components 1, which in front in claw-ended manner grip around a trunnion 3 projecting from the front fork 2 of the bicycle. The trunnion portion 3 locks together the front ends of the two lateral frame components. The lateral frame components are moreover held together by a saddle pillar component 4. In the embodiment shown the front fork is of conventional type, i.e. with two arms. It is of course within the scope of the invention also to design the fork with one arm, so that the front wheel of the bicycle is supported on one side only.

In the illustrated embodiment of the components forming part of the bicycle they are well adapted to be manufactured of, for example, suitably reinforced plastics in a die casting process. The two lateral frame components are designed as substantially planar elements with stiffening grooves 5 extending longitudinally along their surfaces. The two lateral frame components are at the front designed with portions 6 and 7 respectively, of which one is a counterpart to the other, said portions being vertically displaced in such a way that their claw-ended grip approximately functions as a hinge, in which the two hinge halves form a common sleeve and are held together by means of a cotter pin traversing said sleeve. The saddle pillar component 4 is on its opposing sides provided with dovetail slots 8, a bar 10 of substantially U-shaped cross-section being inserted into a channel-shaped recess 9 in each one of the lateral frame components, said bar slightly projecting outside of the inside of the lateral frame component and having an exterior shape, which substantially corresponds to the shape of a corresponding groove 8 of the saddle pillar component 4. It is of course also within the scope of the invention to cast the lateral frame component with a correspondingly shaped ledge instead of the extra profile 10. Pressed-out portions of the lateral frame components indicated with 11 have inserted ring-shaped slide bearings 12, which form a bearing for a tread shaft 13 provided with a sprocket wheel 14. Pedal arms 15 are in rigid mounting connected with the tread shaft 13 outside of the lateral frame components. The front fork 2 has two parallel fork prongs 16, which in their upper portion via a shoulder 17 blend into a sleeve-shaped shank 18, and at its top interspaced round its periphery have a number of pawl means 19, which constitute integrated parts of the wall of the sleeve 18, and of which the noses 19a can be bent inwards towards the centre by utilizing the springing property of the wall material. The handle bar component 20 is likewise provided with a downwards extending sleeve-shaped shank 21, of which the low end has a number of interspaced pawls 22 around its periphery of substantially the same design as the pawls 19 of the fork component and the noses 22a of said pawls 22 can against the springing property of the material of the handle bar be bent inwards.

When the bicycle is going to be assembled, a thrust bearing 23 is suitably threaded over the fork sleeve 18 and is lowered down into a resting position against the shoulder 17. A spacer sleeve 24 is subsequently threaded over the sleeve and is made to rest against the thrust bearing 23. The spacer sleeve 24 suitably has a length, which substantially corresponds to the height of the sum of the heights of the steering hub portions 6, 7 of the lateral frame components. Thereafter the lateral frame components are put together having the position illustrated in FIG. 2, and the front fork is inserted from below into the hole 25 of the steering hub portion and locked to this steering hub portion by means of a second thrust bearing 26 which is threaded in downwards direction, until it snaps into position underneath the noses 19a of the pawls. Thereafter the sleeve shank 21 of the handle bar is brought down through the fork sleeve 18 until the noses 22a of the pawls snap outwards striking against stops 27 of the shank portion 28 of the front fork. The stops 27 are shaped in recesses 28a of the front fork, the width of said recesses substantially corresponding to the width of the pawls 22, so that a pivoting of the handle bar shank 21 relative to the fork sleeve 18 is impeded. An annular projection projecting downwards from the underside of the handle bar 20 is indicated with 29 and covers the portion of the fork sleeve 18 located above the thrust bearing 26. When the handle bar sleeve 21 is brought down in the fork sleeve 18, the pawls 19 are locked, so that they cannot perform a springing movement in inwards direction. By this arrangement the risk of the components forming part of the steering system falling apart is eliminated, even if they should be subjected to very rough treatment. A lamp is indicated with 30 and is at its underside provided with a number of contact pins 31, which cooperate with corresponding pins in the upper portion of the handle bar. The current supply to the lamp is suitably arranged by means of circuits incorporated into the different components in connection with the casting process. Due to the plug contact connection between the lamp and the handle bar, the lamp can easily be removed in order to be used as a portable light. When it is going to be used as a portable light, it is suitable that one or several flashlight batteries can be accommodated in the same. Thereafter the two lateral frame components are coupled together by means of the saddle pillar 4, which is pushed down in such a manner that the groove 8 of the saddle pillar slides into engagement with the bar 10. In the illustrated embodiment the ringshaped sliding bearings 12 serve as stops for the lower end of the saddle pillar. In order to provide space for the sprocket wheel 14, the saddle pillar has a recess 32. It is of course also possible to utilize a shorter saddle pillar component, into which a separate upper saddle pillar top component is introduced, or with which said upper component in some other arrangement can be coupled together. The portions of the lateral frame components projecting in backwards direction behind the saddle pillar form a rear wheel fork.

The front wheel of the bicycle is indicated with 33 and its rear wheel is indicated with 34. The two wheels are in conventional manner connected with the front fork and the rear fork respectively by means of shaft pivots traversing the fork ends. In the illustrated embodiment also the wheels of the bicycle are made of cast material. As is evident from the FIG. 11, the wheels are here designed as a shell structure with two halves laid together after the casting operation. It is of course also possible to use conventional wheels with normal spokes of steel wire. A chain tightener indicated with 35 is springloaded, the spring force tending to pivot the same in clockwise direction according to FIG. 1 and thus maintain the lower portion of the chain 36 in stretched condition. Because of the fact that the chain is located between the two lateral frame components any extra chain guard is not required. The wheel shafts can of course be connected with their corresponding forks by means of snap-in connecting means, which very much simplifies the mounting work. In the same manner the pedal arms 15 can be coupled together with the pedal shaft 13. A child's seat mounted on the bicycle and indicated with 37 can suitably be delivered as extra equipment. The saddle 38 of the bicycle can be of conventional type and be provided with a connecting detail, which in a sliding manner can be mounted on the top of the saddle pillar.

Also the wheel mudguards 39 and 40 and the carrier 41 provided at the front can by means of snap-in connecting means be attached to the bicycle frame or to the front fork respectively.

As the bicycle in its entirety is designed in such a manner that the different components can be connected by means of snap-in operations, the mounting will be a very simple matter, and can be performed by anyone without previous knowledge and without any complicated mounting instructions being required. This means that nobody needs to refrain from buying the bicycle assembly kit in question because of a feeling of insecurity with respect to the mounting. When made of a suitable material, as for example fibre reinforced plastics, the weight of the bicycle will be very low at the same time that it will be practically unaffected by weather conditions.

Because of the fact that each individual component has an extension substantially lying in one plane, the components of the bicycle assembly kit can be very densely packed, which means that the packing can be comparatively thin, which is of advantage in connection with storage and transportation.

The invention is not limited to the embodiment described above and illustrated in the drawings by way of example only, but can be varied as to its details within the scope of the following claims.

We claim:

1. Assembly of prefabricated bicycle components comprising a frame member component having a sleeve-shaped steering hub, a front fork component provided with a sleeve portion, upper and lower thrust stops formed on said sleeve portion engaging the upper and lower ends respectively of the steering hub, the upper thrust stop being formed by outwardly pointing spring pawls adapted to cam into the corresponding end portion of the steering hub by snap action when the sleeve portion is being inserted into the steering hub, and the lower thrust stop comprising a lower thrust shoulder on said sleeve portion, a handle bar component provided with a sleeve shank, said sleeve shank having an outer diameter which substantially corresponds to the inner diameter of said sleeve portion of said front fork component, said sleeve shank having spring pawls in its lower portion and a shoulder in its upper portion which cooperate with lower and upper counter-stops respectively of said sleeve portion of said front fork component.

2. Assembly of prefabricated bicycle components according to claim 1, wherein said sleeve shank of said handle bar component comprises a tube fitting the sleeve portion of said front fork component which also comprises a tube, the pawls of both tubes being shaped by wall material of the tubes between slits extending from the free ends of said tubes.

3. Assembly of prefabricated bicycle components according to claim 1 or 2, wherein thrust bearings are placed between the ends of said steering hub and said shoulders of said sleeve portion of said front fork component and said sleeve shank of said handle bar component respectively.

* * * * *